United States Patent
Smith

(10) Patent No.: US 8,484,416 B2
(45) Date of Patent: Jul. 9, 2013

(54) HIGH AVAILABILITY RAID USING LOW-COST DIRECT ATTACHED RAID CONTROLLERS

(75) Inventor: Gerald Edward Smith, Boulder, CO (US)

(73) Assignee: LSI Corporation, San Jose, CA (US)

( * ) Notice: Subject to any disclaimer, the term of this patent is extended or adjusted under 35 U.S.C. 154(b) by 256 days.

(21) Appl. No.: 12/978,165

(22) Filed: Dec. 23, 2010

(65) Prior Publication Data
US 2012/0166724 A1   Jun. 28, 2012

(51) Int. Cl.
G06F 12/16   (2006.01)

(52) U.S. Cl.
USPC ............................................ 711/114; 711/112

(58) Field of Classification Search
None
See application file for complete search history.

(56) References Cited

U.S. PATENT DOCUMENTS

| | | | |
|---|---|---|---|
| 2005/0102549 A1* | 5/2005 | Davies et al. | 714/4 |
| 2007/0165660 A1 | 7/2007 | Fang et al. | |
| 2008/0126885 A1 | 5/2008 | Tangvald et al. | |
| 2009/0083484 A1* | 3/2009 | Basham et al. | 711/114 |

FOREIGN PATENT DOCUMENTS

| | | |
|---|---|---|
| WO | 2010056242 | 5/2010 |
| WO | WO 2010056242 A1 * | 5/2010 |

* cited by examiner

*Primary Examiner* — Than Nguyen
(74) *Attorney, Agent, or Firm* — Christopher P. Whitham; Cochran Freund & Young LLC

(57) ABSTRACT

A method and storage controller for providing active-active RAID functionality within storage controller device(s). An embodiment may utilize zoning capabilities to assign a subset of physical storage devices with each storage controller. One or more storage controllers may detect that a storage controller/server has failed and may reconfigure zoning of the physical storage devices originally zoned in with the failed storage controller such that the physical storage devices of the failed zone are zoned out of the failed zone and zoned in with at least one of the remaining functional storage controllers. A reverse process may be used on recovery. An embodiment may further represent each of the physical devices zoned in with a storage controller as at least one virtual storage device and configure an additional comprehensive zone incorporating the storage controllers such that each storage controller has access to all physical storage devices through the virtual storage devices.

20 Claims, 8 Drawing Sheets

200 ZONE BLOCK DIAGRAM OF 2 STORAGE CONTROLLERS/SERVERS, PHYSICAL DEVICES (PD), VIRTUAL DEVICES (VD), A COMPREHENSIVE ZONE X, & WITH NO FAILURES FOR AN EMBODIMENT

HIGH AVAILABILITY RAID USING LOW-COST DIRECT ATTACHED RAID CONTROLLERS

BACKGROUND OF THE INVENTION

An early high speed protocol for communications between a computer and a computer readable storage media device was the parallel bus based Small Computer System Interface (SCSI). A current protocol that replaces the original parallel bus based SCSI protocol is the serial based Serial Attached SCSI (SAS) protocol. An advancement for computer systems implementing SAS compatible device architectures was the addition of SAS expander physical devices. An SAS expander permits the creation of more complex interconnect topologies. An SAS expander expands the capabilities of a typical SAS controller and permits a larger number of target devices to be connected and accessed by a computer system than would be possible connecting the end devices directly to the physical ports of the SAS controller incorporated in the computer system. A further advancement for computer systems implementing SAS compatible device architectures is the incorporation of SAS zoning into the SAS protocol. SAS zoning provides for an ability to segregate and manage physical device traffic on the SAS buses interconnecting the physical devices. The access control functionality of SAS zoning is implemented on the SAS expanders. Using SAS zoning, SAS initiators and targets may not see the entire SAS architecture, but, instead, the initiators and targets may only see the portions of the SAS architecture configured to be in the zoning group that the initiators and targets have been given permission to access. In other words, by configuring zoning groups, a SAS topology may be implemented within the SAS architecture where devices may be effectively limited to access to and from other devices in the same zoning group.

SUMMARY OF THE INVENTION

An embodiment of the present invention may comprise a method for active-active RAID (Redundant Array of Independent Disks) functionality for a DAS (Direct Attached Storage) RAID system using storage controllers connected in a SAS (Serial Attached SCSI (Small Computer System Interface)) architecture comprising: connecting a plurality of storage controllers to an expander system, the expander system supporting SAS zoning; connecting a plurality of physical storage devices (PDs) to the expander system; configuring zoning of the DAS RAID system such that there is a plurality of separate and unique PD subset zones, each PD subset zone of the plurality of PD subset zones is zoned in with one storage controller of the plurality of storage controllers, each PD subset zone is further zoned in with a unique subset of PDs from the plurality of PDs, and each unique subset of PDs does not have cross-membership of PDs with another subset of PDs zone in with a different PD subset zone; detecting by at least one functioning storage controller of the plurality of storage controllers that another storage controller has failed; reconfiguring by the at least one functioning storage controller of the plurality of storage controllers the zoning of the DAS RAID system such that each PD from the unique subset of PDs zoned in with the separate and unique PD subset zone that corresponds to the failed another storage controller is zoned in with the separate and unique PD subset zone that corresponds to one of the plurality of storage controllers that have not failed, and each PD of the PDs from the unique subset of PDs zoned in with the separate and unique PD subset zone that corresponds to the failed another storage controller is zoned out of the separate and unique PD subset zone that corresponds to the failed another storage controller; and accessing PDs from each unique subset of PDs of the plurality of unique subsets of PDs by the storage controller that is zoned in with each separate and unique PD subset zone that corresponds to each unique subset of PDs of the plurality of unique subsets of PDs as reconfigured to zone out the failed another storage controller.

The embodiment of the present invention described in the previous paragraph further comprising: representing PDs from each unique subset of PDs of the plurality of unique subsets of PDs by the storage controller that is zoned in with each separate and unique PD subset zone that corresponds to each unique subset of PDs of the plurality of unique subsets of PDs as at least one virtual storage device (VD); accessing each PD from each unique subset of PDs of the plurality of unique subsets of PDs by the storage controller that is zoned in with each separate and unique PD subset zone that corresponds to each unique subset of PDs of the plurality of unique subsets of PDs via the at least one VD corresponding to each PD from each unique subset of PDs of the plurality of unique subsets of PDs; configuring the zoning of the DAS RAID system such that there is a comprehensive zone that zones in each storage controller of the plurality of storage controllers and does not zone in PDs from the plurality of PDs such that the at least one VD representing PDs zoned in with each storage controller of the plurality of storage controllers is accessible by other storage controllers of the plurality of storage controller; accessing PDs zoned in with a PD subset zone corresponding to the other storage controllers of the plurality of storage controllers from each storage controller of the plurality of storage controllers via the at least one VD representing the PDs zoned in with the PD subset zone corresponding to the other storage controllers of the plurality of storage controllers.

An embodiment of the present invention may further comprise a storage controller device for active-active RAID (Redundant Array of Independent Disks) functionality for a DAS (Direct Attached Storage) RAID system connected in a SAS (Serial Attached SCSI (Small Computer System Interface)) architecture having the plurality of storage controllers connected to an expander system, a plurality of physical storage devices (PDs) to the expander system, wherein the expander system supports SAS zoning, and zoning of the DAS RAID system is configured such that there is a plurality of separate and unique PD subset zones, each PD subset zone of the plurality of PD subset zones is zoned in with one storage controller of the plurality of storage controllers, each PD subset zone is further zoned in with a unique subset of PDs from the plurality of PDs, and each unique subset of PDs does not have cross-membership of PDs with another subset of PDs zone in with a different PD subset zone, the storage controller device comprising: an active-active zone management module that detects that another storage controller of the plurality of storage controllers has failed, reconfigures the zoning of the DAS RAID system such that each PD from the unique subset of PDs zoned in with the separate and unique PD subset zone that corresponds to the failed another storage controller is zoned in with the separate and unique PD subset zone that corresponds to one of the plurality of storage controllers that have not failed, and each PD of the PDs from the unique subset of PDs zoned in with the separate and unique PD subset zone that corresponds to the failed another storage controller is zoned out of the separate and unique PD subset zone that corresponds to the failed another storage controller; and a PD access module that accesses PDs from the unique subset of PDs of the plurality of unique subsets of PDs that are zoned in with the separate and unique PD subset zone that corresponds to the storage controller device, including PDs as reconfigured to zone out the failed another storage controller.

The embodiment of the present invention described in the previous paragraph wherein: the PD access module further represents each PD from the unique subset of PDs of the plurality of unique subsets of PDs that are zoned in with the separate and unique PD subset zone that corresponds to the storage controller device as at least one virtual storage device (VD), accesses each PD from the unique subset of PDs of the plurality of unique subsets of PDs that are zoned in with the separate and unique PD subset zone that corresponds to the storage controller device via the at least one VD corresponding to each PD from each unique subset of PDs of the plurality of unique subsets of PDs; the zoning of the DAS RAID system is configured such that there is a comprehensive zone that zones in each storage controller of the plurality of storage controllers and does not zone in PDs from the plurality of PDs such that said at least one VD representing PDs zoned in with each storage controller of the plurality of storage controllers is accessible by other storage controllers of the plurality of storage controller; and the PD access module further accesses each PD from the unique subset of PDs of the plurality of unique subsets of PDs that are zoned in with the separate and unique PD subset zone that corresponds to the storage controller device in response to input/output requests for the at least one VD representing the PDs from the unique subset of PDs of the plurality of unique subsets of PDs that are zoned in with the separate and unique PD subset zone that corresponds to the storage controller device.

DETAILED DESCRIPTION OF THE EMBODIMENTS

Figure 1:
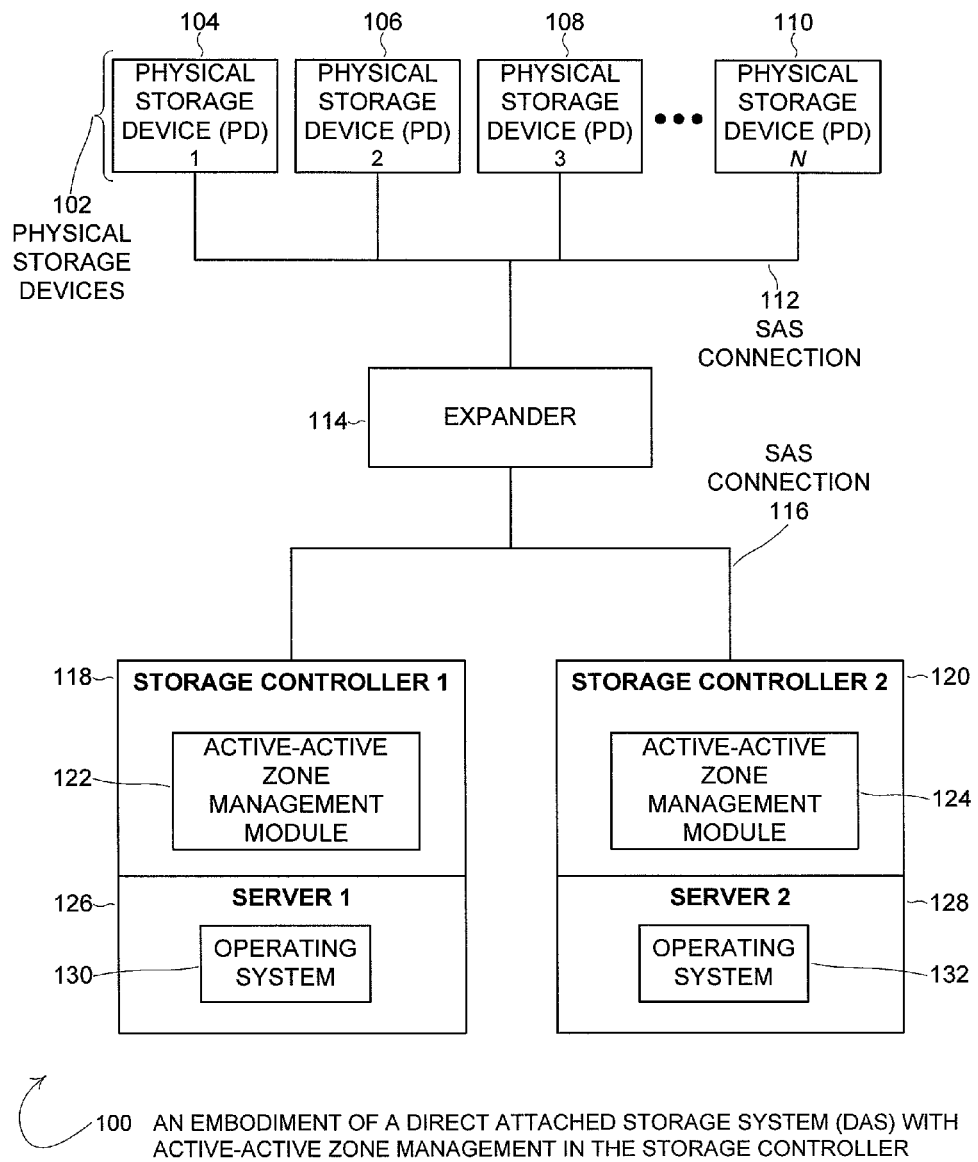
FIG. 1 is block diagram of DAS (Direct Attached Storage) RAID (Redundant Array of Independent Disks) storage controllers with active-active zone management in the storage controllers operating within a SAS (Serial Attached SCSI (Small Computer System Interface)) architecture.

FIG. 1 is block diagram 100 of DAS (Direct Attached Storage) RAID (Redundant Array of Independent Disks) storage controllers 118, 120 with active-active zone management in the storage controllers 118, 120 operating within a SAS (Serial Attached SCSI (Small Computer System Interface)) architecture 100. For a typical DAS system, the physical storage devices 102 are incorporated as "local" to each server 126, 128 under the control of the storage controllers 118, 120 incorporated with (i.e., associated with, operating with, integrated with, etc.) the host server 126, 128. Further, a typical DAS system does not share access to or control of the physical storage devices 102 with other storage controllers 118, 120 and associated servers 126, 128.

An embodiment may provide a fault-tolerant active-active RAID storage system 100 using low cost DAS RAID storage controllers 118, 120, without requiring expensive external RAID storage systems. Generally, an embodiment may use a SAS port expander 114 that supports SAS zoning in order to separate the control of and access to subsets of physical storage devices 102 (PDs). Further, there may be a separate and distinct subset of the overall group of PDs 102 for each separate storage controller 118, 120, and the server 126, 128 associated with each storage controller 118, 120. An embodiment may configure the zoning of the DAS RAID system on the SAS architecture to restrict visibility of each subset of PDs to the specific storage controller 118, 120 and server 126, 128 combination desired to manage control of and access to the particular subset of PDs. By restricting visibility of each of the subsets of PDs to particular storage controller 118, 120 and associated servers 126, 128 via SAS zoning, a single physical SAS architecture 100 may be dynamically reconfigured to change the visibility of the PDs 102 to different storage controllers 118, 120 and the server 126, 128 associated with the storage controller 118, 120. Leveraging the dynamic reconfiguration capability of SAS zoning, an embodiment may update the SAS topology to reassign the zoning of PDs 102 assigned to (i.e., zoned in) with a failed storage controller 118, 120 and/or server 126, 128 when a non-failed storage controller 118, 120 detects that another storage controller 118, 120 and/or associated server 126, 128 has failed. The non-failed storage controller(s) 118, 120 may then reassign the zoning to remove (i.e., zone out) the PDs 102 from the failed storage controller 118, 120 and/or server 126, 128, and add (i.e., zone in) the PDs 102 from the failed zone to the zone of one of the surviving storage controllers 118, 120. If and when the failed storage controller 118, 120 and/or server 126, 128 returns to normal operation, an embodiment may reverse the active-active reassignment of the zones of the PDs originally in the failed zone so that the PDs are reassigned back to the zone including the failed storage controller 118, 120 in order to return the system to normal operation. For a further description of the active-active zoning functionality, please see the disclosure with respect FIGS. 2 and 3 for zoning and FIGS. 4 and 5 for the flow of operations.

As an example, in the embodiment shown in FIG. 1, an embodiment may zone in PD 1 (104) and PD 2 (106) with storage controller 1 (118) to create a first PD subset zone. The embodiment may further zone in PD3 (108) through PDN 110 with storage controller 2 (120) to create a second PD subset zone. If the active-active zone management module 122 operating within storage controller 1 (118) were to detect that storage controller 2 (120) and/or server 2 (128) had failed, the active-active zone management module 122 of storage controller 1 (118) would reconfigure the zoning of the PDs 102 in order to change the zoning of PD 3 (108) through PDN (110) that were zoned in with failed storage controller 2 (120)/server 2 (128), so that PD 3 (108) through PDN (110) zoned in to the failed zone would be reassigned to the remaining functional storage controller 1 (118)/server 1 (120). Thus, management of and access to PD 3 (108) through PDN (110) originally zoned into the failed zone would now be performed by storage controller 1 (118)/or associated server 1 (126). When the active-active zone management module 122 operating within storage controller 1 (118) detects that storage controller 2 (120) and server 2 (128) have returned and are functional, the active-active zone management module 122 operating within storage controller 1 (118) may then reconfigure the zoning to the original zoning configuration such that PD 3 (108) through PDN (110) are zoned in to the second PD subset zone with storage controller 2 (120) and the system operates as originally configured. Other embodiments may integrate/associate two or more storage controllers with a single host server such that the single host server acts as the associated host server for the one or more storage controllers. The configuration of the zoning still zones in each storage controller with a particular subset of PDs such that the access to PDs in a different zone than a particular storage controller is still restricted with regard to the particular storage controller even if the particular storage controller is integrated/associated with the same associated host server as other storage controllers. Hence, for the embodiment shown in FIG. 1, storage controller 1 (118) and storage controller 2 (120) may both be integrated with server 1 (126), but still have the same zoning configured and enforce communication restrictions between the storage controllers 118, 120 as described for the embodiment shown FIG. 1 have server 1 (126) and server 2 (128).

As described above, the implementation of the SAS topology with a zone assigned for a subset of PDs and a single storage controller 118, 120, restricts access to the subset of PDs to the storage controller 118, 120 and associated server 126, 128 zoned in with the subset of PDs. Other storage controllers 118, 120 and associated servers 126, 128 not zoned in with the subset of PDs would not be able to access the subset of PDs. While maintaining the separation of the management of the control of and access to a subset of PDs through a single storage controller 118, 120, an embodiment may provide access to PDs 102 not zoned in as part of the PD/storage controller zone (i.e., the "PD subset" zone) by configuring an additional zone, a "comprehensive" zone, that zones in (i.e., includes) just the storage controllers 118, 120 and not the PDs 102. In the drawings and the specification herein, the comprehensive zone may also be referred to as "Zone X." With the comprehensive zone configured to zone in each of the storage controllers 118, 120, each storage controller 118, 120 may have visibility to each of the other storage controllers 118, 120 in the SAS topology. Each storage controller 118, 120 represents PDs included in the subset of PDs zoned in with the storage controller as at least one virtual storage device (VD). Various embodiments may have a one-to-one correspondence between PDs and VDs. Other embodiments may incorporate multiple PDs into a single VD. Still other embodiments may have some VDs that represent a single PD and other VDs that represent a plurality of PDs. The storage controller presents the VDs to the host server 126, 128 to provide access to the actual PDs that the VDs represent. Since each storage controller 118, 120 represents the PDs zoned in with the storage controller 118, 120 in the PD subset zone associated with the storage controller 118, 120 as VDs, the VDs of each storage controller 118, 120 are visible to the other storage controllers 118, 120. Hence, each storage controller 118, 120, and subsequently each server 126, 128 associated with each storage controller 118, 120, has access to VDs that represent the PDs for all PDs 102 zoned in with the group of storage controllers that are zoned in as part of the comprehensive zone (i.e., Zone X). To simplify the description, it is helpful to define some terminology. A "local" VD is a VD representing a PD zoned in as part of the PD subset zone with a storage controller 118, 120. A "local" storage controller 118, 120 is the storage controller 118, 120 presenting the VD that directly represents a PD 102. A server 126, 128 may be considered "local" if the server 126, 128 is associated with (i.e., integrated with) the local storage controller 118, 120. A "remote" VD is a VD representing a PD zoned in as part of the PD subset zone of a different storage controller 118, 120 than the local storage controller 120, 118 attempting to access the VD. The different storage controller 120, 118 than the local storage controller 118, 120 would be considered the "remote" storage controller 120, 118. Similarly, the server 128, 126 associated with (i.e., integrated with) the remote storage controller 120, 118 may be considered the "remote" server 120, 118. Ultimately, the local storage controller 118, 120 is the storage controller 118, 120 that handles Input/Output (I/O) requests to the PDs 102 represented by the VDs, even if the I/O requests originated from a remote storage controller 120, 118 and/or a remote server 128, 126. In view of the above described terminology, server 126, 128 I/O requests issued to "local" VDs are processed directly by the local storage controller 118, 120 associated with the server 126, 128. I/O requests issued by a server 128, 126 to VDs that are remote and are "owned" by a storage controller 118, 120 not associated with the remote server 128, 126 are redirected through the SAS topology to the storage controller 118, 120 that is local to the VD being accessed. Thus, the control of and access to the PDs 102 of an embodiment remains controlled by the local storage controller 118, 120 zoned in as part of the PD subset zone of a PD, but access may be made to a PD by a remote storage controller by sending the request to the remote VD made available to the remote storage controller 120, 118 through the comprehensive zone. In this way, the access to and control of a subset of PDs zoned in with a storage controller 118, 120 is restricted so that the I/O requests for the PDs zoned in with the storage controller 118, 120 are handled by the local storage controller, even when the I/O request originated from a remote storage controller 120, 118/server 128, 126. Again, for a further description of the active-active zoning functionality, please see the disclosure with respect FIGS. 2 and 3 for zoning and FIGS. 4 and 5 for the flow of operations.

For the example described above for the embodiment shown in shown in FIG. 1, an embodiment may zone in PD 1 (104) and PD 2 (106) with storage controller 1 (118) to create a first PD subset zone and the embodiment may further zone in PD3 (108) through PDN 110 with storage controller 2 (120) to create a second PD subset zone. Storage controller 1 (118) may represent PD1 (104) as virtual storage device 1 (i.e., VD1) and PD2 (106) as VD2. Storage controller 2 may represent PD3 (108) through PDN (110) as VD3 through VDN. A comprehensive zone (i.e., Zone X) may be created that includes storage controller 1 (118) and storage controller 2 (120) such that VD1 through VDN is incorporated into the comprehensive zone, with VD1 and VD2 being handled by storage controller 1 (118) and VD3 through VDN being handled by storage controller 2 (120). As for the example given above for FIG. 1, PD1 (104) and PD2 (106) are still not directly visible to storage controller 2 (120) and associated server 2 (128) through the SAS topology, but may be accessed by storage controller 2 (120) and/or associated server 2 (128) through the VD1 and VD2 presented by storage controller 1 (118) and incorporated into the comprehensive zone of the SAS topology. Likewise, PD3 (108) through PDN (110) are also not directly visible to storage controller 1 (118) and associated server 1 (126) through the SAS topology, but may be accessed by storage controller 1 (118) and/or associated server 1 (126) through VD3 through VDN presented by storage controller 2 (120) and incorporated into the comprehensive zone of the SAS topology. Further, an embodiment may advantageously use the knowledge of the VDs of the other storage controllers 118, 120 to perform zoning reassignments when another storage controller 118, 120 and/or associated server 126, 128 is detected as failed.

In an embodiment, the operation of the active-active zoning reconfiguration is performed within the storage controllers 118, 120 in an active-active zone management module/subsystem 122, 124 operating within the storage controllers 118, 120. Performing the active-active zone management within the storage controllers 118, 120 effectively makes the storage controllers 118, 120 failover capable storage controllers. Further, by performing the active-active RAID functionality in the active-active zone management modules 122, 124 operating within the storage controllers 118, 120, it is not necessary to take the expensive and time consuming step of recreating and testing the active-active zone management module 122, 124 to operate within different, and often very complex, operating systems 130, 132 of the associated host servers 126, 128.

Generally, the storage controllers 118, 120 may include a PD access processing module/subsystem that manages the physical storage devices (PDs) 102. The PDs 102 may include any suitable physical storage devices, including, but not limited to: Hard Disk Drives (HDDs), Solid State Media Disks (SSDs), tape drives, optical drives, etc. The storage controller 118, 120 is associated with a host server 126, 128. The storage controller 118, 120 may be a separate device with a communication connection to the host server 126, 128, or the storage controller 118, 120 may be integrated into the host server 126, 128 as a peripheral card or built directly into the hardware components of the host server 126, 128 as a storage controller 118, 120 subsystem/module of the host server 126, 128. Also, an embodiment may use storage controllers 118, 120 specifically denoted to be DAS RAID storage controllers.

In the example embodiment shown in FIG. 1, the PDs 102 are connected to an expander 114 via SAS connection 112 and the two storage controllers 118, 120 are connected to the expander 114 via SAS connection 114. In the example embodiment shown in FIG. 1, there is a single expander 114, but one skilled in the art would recognize that the expander functionality of expander 114 may be implemented using a single expander (such as expander 114), or using multiple expanders operating together as an expander system. One purpose of the expander 114 or expander system is to provide additional communication ports in the SAS architecture, hence the name "expander" for expanding the availability of ports. Another potential function of the expander 114 or expander system is to provide support for SAS zoning. As the various embodiments use zoning, whether the expander 114 functionality is implemented as a single expander 114, or as a system of multiple expanders, the expander 114 or expander system, will need to support SAS zoning to implement an embodiment. A typical expander 114 that supports zoning may incorporate a zone management module to handle the communication restrictions involved in a configured zone along with a zone table data structure that stores the zoning information. The initial configuration of the zoning structure stored within the expander 114 (i.e., what is zoned in and zoned out with respect to particular devices within the SAS topology) may be performed through a configuration interface to the expander 114, programmed via boot code, or programmed on line from an external device such as storage controllers 118, 120. For the various embodiments, dynamic reconfiguration of the zoning structure stored within the expander 114 to account for failures and recovery from failure of storage controllers 118, 120/associated servers 126, 128 is performed by at least one of non-failed storage controller 118, 120.

Figure 2A:
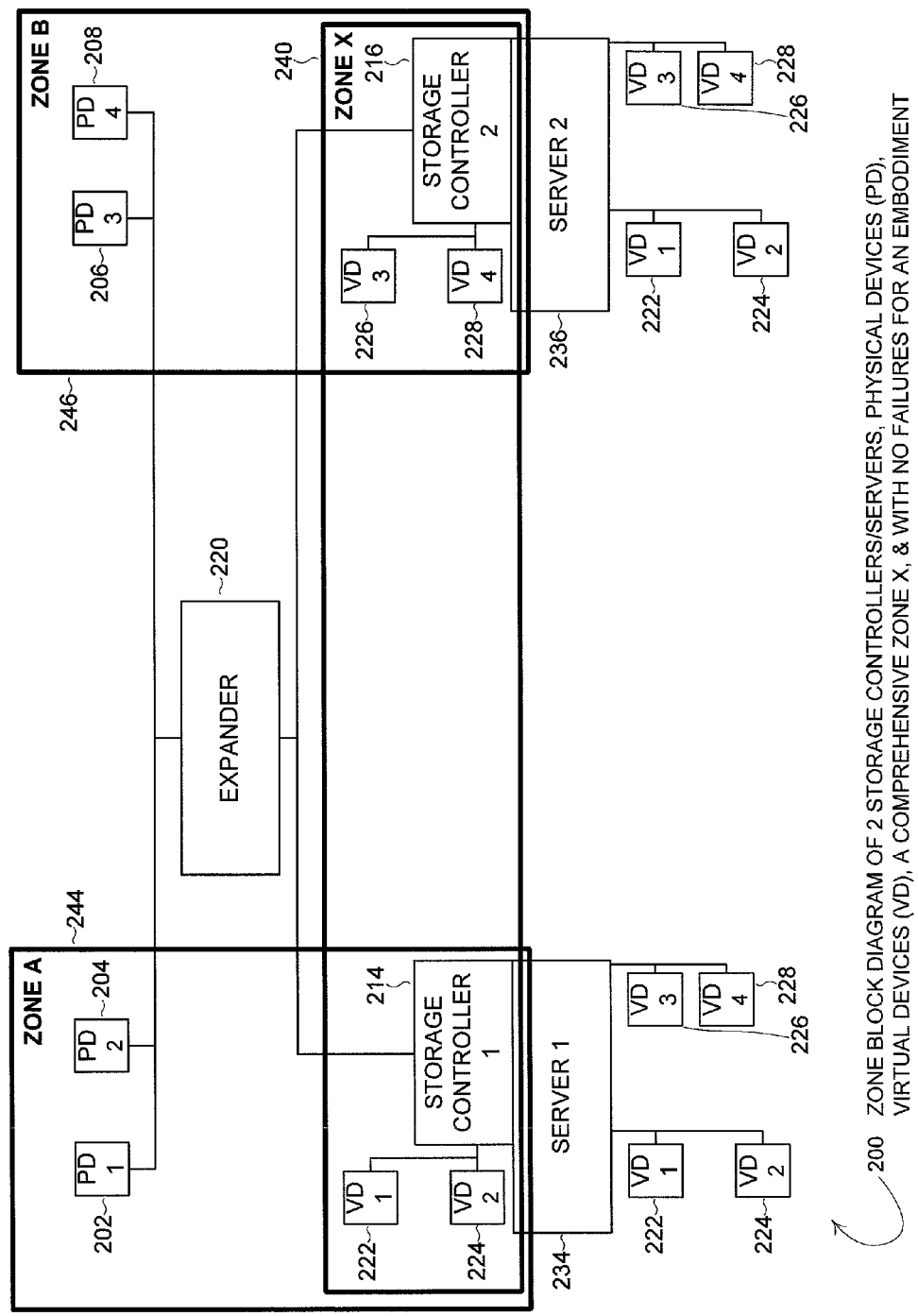
FIG. 2A is a zone block diagram of a system with two storage controllers & associated servers, physical storage devices (PDs), virtual storage devices (VDs), a comprehensive zone (zone x), and without any failed storage controllers/servers.

FIG. 2A is a zone block diagram 200 of a system with two storage controllers 214, 216 & associated host servers 234, 236, physical storage devices (PDs) 202-208, virtual storage devices (VDs) 222-228, a comprehensive zone (Zone X) 240, and without any failed storage controllers/servers. FIG. 2A shows the state of the zoning assignments 240, 244, 246 before a failure of a storage controller 214, 216/server 234, 236, and/or after the recovery from a failure of a storage controller 214, 216/server 234, 236. The disclosure with respect to FIG. 2B describes the embodiment with a failure in storage controller 2 (216) and/or associated server 2 (236). In the embodiment shown in FIGS. 2A and B, the PDs 202-208 are connected to the storage controllers 214, 216 and associated host servers 234, 236 through expander 220. The embodiment shown in FIGS. 2A and B is a basic embodiment having just two storage controllers 214, 216 and associated servers 234, 236. The first PD subset zone is configured as Zone A 244 and includes PD1 (202), PD2 (204), and storage controller 1 (214). Storage controller 1 (214) represents PD1 (202) as VD1 (222) and PD2 (204) as VD2 (224). Server 1 (234) associated with storage controller 1 (214) may then have "local" access to VD1 (222) and VD2 (224) as the host server 234 of storage controller 1 (214). The second PD subset zone is configured as Zone B 246 and includes PD3 (206), PD4 (208), and storage controller 2 (216). Storage controller 2 (216) represents PD3 (206) as VD3 (226) and PD4 (208) as VD4 (228). Server 2 (236) associated with storage controller 2 (216) may then have "local" access to VD3 (226) and VD4 (228) as the host server 236 of storage controller 2 (216). Without a comprehensive zone, Zone X 240, storage controller 2 (216)/server 2 (236) would not have access to PD1 (202) or PD2 (204) since storage controller 2 (216) is not included in Zone A 244 (i.e., is zoned out of Zone A 244). Likewise, without a comprehensive zone, Zone X 240, storage controller 1 (214)/server 1 (234) would not have access to PD3 (206) or PD4 (208) since storage controller 1 (214) is not included in Zone B 246 (i.e., is zoned out of Zone B 246).

To gain some form of access to all PDs 202-208 from each storage controller 214, 216, a comprehensive zone, Zone X 240, may be configured for an embodiment. Zone X 240 may be configured to zone in the storage controllers 214, 216, but not to zone in the PDs 202-208. Since each storage controller 214, 216 represents the PDs 202-208 zoned in with the storage controller 214, 216 in the associated PD subset zone (i.e., Zones A 244 and B 246) as a virtual storage device (VD) 222-228, a storage controller 214, 216 that does not have access to a PD 202-208 within a local PD subset zone (such as Zone A 244 and Zone B 246), may still gain access to a PD 202-208 by being zoned in with the other storage controllers 214, 216 in the comprehensive Zone X 240 because each of the VDs 222-228 associated with each of the PDs 202-208 are made visible to each of the storage controllers 214, 216 within comprehensive Zone X 240. Consequently, storage controller 1 (214) and associated server 1 (234) may access formerly inaccessible PD3 (206) and PD4 (208) through VD3 (226) and VD4 (228), respectively, which are managed by storage controller 2 (216). Storage controller 2 (216) and associated server 2 (236) may access formerly inaccessible PD1 (202) and PD2 (204) through VD1 (222) and VD2 (224), respectively, which are managed by storage controller 1 (214).

Accordingly, both server 1 (234) and server 2 (236) have visibility/access to VDs 1-4 (222-228). Note that it is not necessary for an embodiment to implement a comprehensive Zone X 240 for the active-active RAID functionality performed by the active-active zone management module of the storage controllers 214, 216 to reassign the zone of PDs 202-208 from a failed PD subset zone (Zone A 244 or Zone B 246) to a non-failed PD subset zone (Zone B 246 or Zone A 244) as described in more detail in the disclosure with respect to FIG. 2B.

Figure 2B:
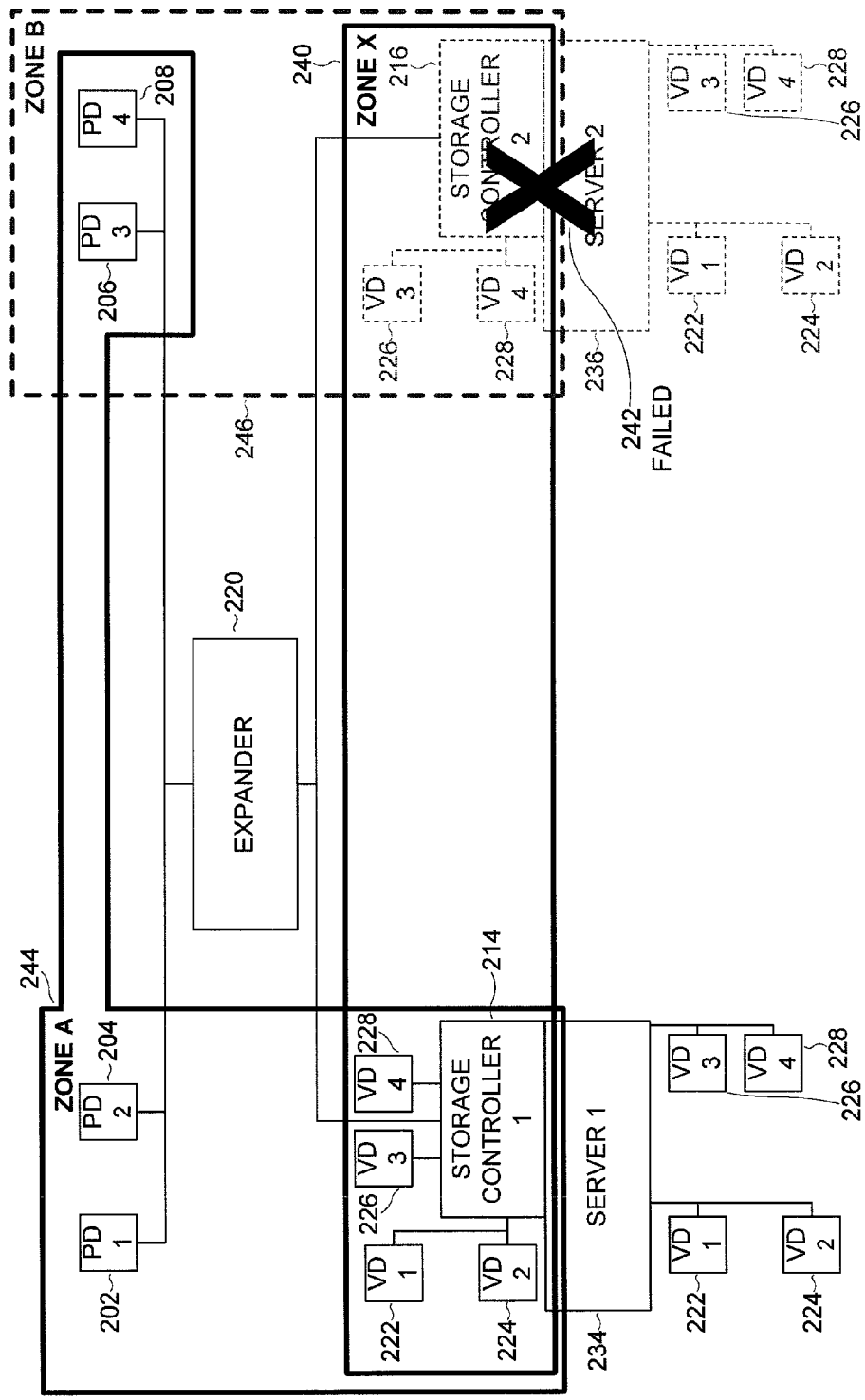
FIG. 2B is a zone block diagram of the embodiment of FIG. 2A with a failed storage controller/server.

FIG. 2B is a zone block diagram 250 of the embodiment of FIG. 2A with a failed 242 storage controller 216/server 236. In the embodiment shown in FIG. 2B, storage controller 1 (214) has detected that storage controller 2 (216) and/or server 2 (236) has failed. One method for storage controller 1 (214) to detect that storage controller 2 (216) and/or server 2 (236) has failed is a simple "heartbeat" monitor where a heartbeat signal is sent from server 2 (236)/storage controller 2 (216) over the SAS communication system, which is monitored by storage controller 1 (214). If the heartbeat signal from storage controller 2 (216)/server 2 (236) is not detected by storage controller 1 (214) for a particular period of time corresponding to the defined period of the heartbeat signals, then storage controller 1 (214) will begin the process of reconfiguring the zoning of PD3 (206) and PD4 (208) into the remaining functional Zone A 244. One skilled in the art will recognize that communication of the heartbeat signal over a communication channel other than the SAS communication system may also effectively achieve failure detection, but will require installation and maintenance of a communication system in addition to the SAS communication system. One skilled in the art will also recognize that any technically feasible means to perform detection of a failed device would be acceptable for implementation of failure detection within the storage controllers 214, 216 in order to detect a failure of the other storage controller 216, 214.

Once storage controller 1 (214) detects that storage controller 2 (216) and/or server 2 (236) has failed 242, then storage controller 1 (214) reconfigures the zoning of PD3 (206) and PD4 (208) to zone out PD3 (206) and PD4 (208) from PD subset Zone B 246, and to zone in PD3 (206) and PD4 (208) with PD subset Zone A 244. See, on FIG. 2B, the long necked extension of Zone A 244 to incorporate PD3 (206) and PD4 (208) that describes the new zoning configuration after the failure 242 of storage controller 2 (216) and/or server 2 (236). With PD3 (206) and PD4 (208) zoned in to PD subset Zone A 244, storage controller 1 (214) now has local access to PD3 (206) and PD4 (208) such that VD3 (226) and VD4 (228) are now local to storage controller 1 (214), and, consequently, are also local to associated server 1 (234). Since there were only two storage controllers 214, 216, when one of the storage controllers fails (as shown in FIG. 2B, storage controller 2 (216) failed 242), then there is only one storage controller remaining in comprehensive Zone X 240 such that comprehensive Zone X 240 no longer provides access to remote VDs 222-228 presented by other storage controllers since there are no other non-failed storage controllers. Therefore, for the failure condition 242 of the embodiment shown in FIG. 2B, all of the VDs 1-4 (202-208) are local to storage controller 1 (214) and are, thus, also local to server 1 (234) associated with controller 1 (214). Accordingly, storage controller 1 (214) and associated server (234) are able to maintain access to PD3 (206) and PD4 (208) by reassigning the zoning appropriately despite the fact that the original storage controller, storage controller 2 (216), zoned in with PD3 (206) and PD4 (208) is considered to be failed 242. When storage controller 1 (214) detects that storage controller 2 (216) and/or server 2 (236) has returned to normal operation, functioning storage controller 1 (214) and/or newly returned functioning storage controller 2 (216) may reconfigure the zoning of PD3 (206) and PD4 (208) such that PD3 (206) and PD4 (208) are zoned out of PD subset Group A 244 and zoned in with the original "owning" PD subset Zone B 246, and the system returns to operation as described in the disclosure with respect to FIG. 2A.

Figure 3A:
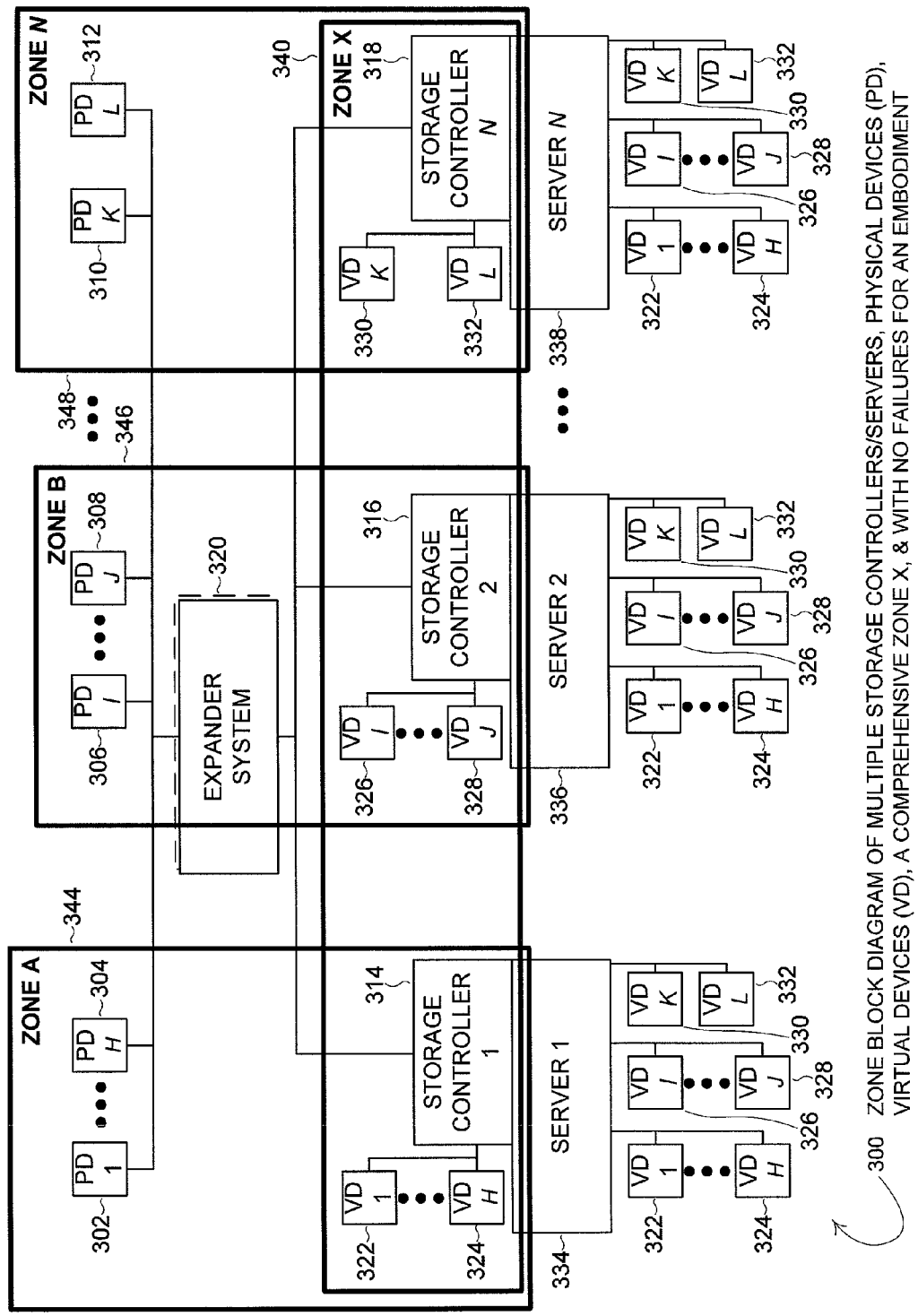
FIG. 3A is a zone block diagram of a system with multiple storage controllers & associated servers, physical storage devices (PDs), virtual storage devices (VDs), a comprehensive zone (zone x), and without any fail storage controllers/servers.

FIG. 3A is a zone block diagram 300 of a system with multiple storage controllers 314-318 & associated servers 334-338, physical storage devices (PDs) 302-312, virtual storage devices (VDs) 322-332, a comprehensive zone (Zone X) 340, and without any failed storage controllers 314-318/servers 334-338. FIGS. 3A and B disclose a more complex embodiment than described in the disclosure with respect to FIGS. 2A and B above. For the embodiment shown in FIGS. 2A and B, the number of storage controllers 214, 216/servers 234, 236 is restricted to two and the number of physical storage devices (PDs) 202-208 is also restricted to two per storage controller 214, 216. Thus, FIGS. 2A and B show a basic embodiment that may be easier to understand than a more complex embodiment as shown in FIGS. 3A and B. In FIGS. 3A and B, there is not a theoretical limit to the number of storage controllers 314-318, or the number of PDs 302-312 per storage controller. However, for ease in describing the active-active functionality, the Nth storage controller 318 is only assigned two PDs (PDK 310 and PDL 312) instead of showing a theoretically unlimited number of PDs for the Nth PD subset Zone N 348. One skilled in the art will recognize that, like PD subset Zone A 344 and Zone B 346, PD subset Zone N 348 may also have a theoretically unlimited number of PDs 310-312 operated on in a similar fashion to PDK 310 and PDL 312, as described below, in the case of a failure of storage controller N 318 and/or associated server N 338. While the number of storage controllers 314-318, associated servers 334-338, and PDs 302-312 is theoretically unlimited, in practice, one skilled in the art will recognize that a real world limit on the number of devices may be encountered due to limitations on the number of ports available on port expanders in the expander system 320.

FIG. 3A shows the state of the zoning assignments 340, and 344-348 before a failure of a storage controller 314-318/server 334-338, and/or after the recovery from a failure of a storage controller 314-318/server 334-338. The disclosure with respect to FIG. 3B describes the embodiment with a failure in storage controller N (318) and/or associated server N (338). In the embodiment shown in FIGS. 3A and B, the PDs 302-312 are connected to the storage controllers 314-318 and associated host servers 334-338 through expander system 320. As described above in the disclosure with respect to FIG. 1, the expander system 320 may be comprised of one or more port expanders where the expander system 320 supports SAS zoning. The first PD subset zone is configured as Zone A 344 and includes PD1 (302) through PDH 304 plus storage controller 1 (314). Storage controller 1 (314) represents PD1 (302) through PDH 304 as VD1 (322) through VDH 324. Server 1 (334) associated with storage controller 1 (314) may then have "local" access to VD1 (322) through VDH 324 as the host server 334 of storage controller 1 (314). The second PD subset zone is configured as Zone B 346 and includes PDI 306 through PDJ 308 plus storage controller 2 (316). Storage controller 2 (316) represents PDI 306 through PDJ 308 as VDI 326 through VDJ 328. Server 2 (336) associated with storage controller 2 (316) may then have "local" access to VDI 322 through VDJ 324 as the host server 336 of storage controller 2 (316). Similar functionality as described for Zones A 344 and B 346 may be expected for Zones C through N−1 as well as storage controllers/servers 3 through N−1 and any associated PDs, which are not specifically shown in FIGS. 3A and B. The Nth PD subset zone is configured as Zone N 348 and includes PDK 310, PDL (312), and storage controller N 318. Storage controller N 318 represents PDK 310 as VDK 330 and PDL 312 as VDL 332. Server N 338 associated with storage controller N 318 may then have "local" access to VDK 330 and VDL 332 as the host server 338 of storage controller N 318. Without a comprehensive Zone X 340, storage controller 2 (316)/server 2 (336) through storage controller N 318/Server N 338 storage would not have access to PD1 (302) through PDH 304 since storage controllers 2 (316) through N 318 are not included in Zone A 344 (i.e., are zoned out of Zone A 344). Also, without a comprehensive Zone X 340, storage controller 1 (314)/server 1 (334) and storage controller 3/server 3 through storage controller N 318/server N 338 would not have access to PDI 304 through PDJ 308 since storage controller 1 (314) and storage controller 3 through storage controller N 318 are not included in Zone B 346 (i.e., are zoned out of Zone B 346). Likewise, without a comprehensive Zone X 340, storage controllers 1 (314)/server 1 (334) through storage controller N−1/server N−1 would not have access to PDK 310 or PDL 312 since storage controllers 1 (314) through N−1 are not included in Zone N 348 (i.e., are zoned out of Zone N 348).

To gain some form of access to all PDs 302-312 from each storage controller 314-318, a comprehensive zone, Zone X 340, may be configured for an embodiment. Comprehensive Zone X 340 may be configured to zone in the storage controllers 314-318, but not to zone in the PDs 302-312. Since each storage controller 314-318 represents the PDs 302-312 zoned in with the storage controller 314-318 in the associated PD subset zone (i.e., Zones A 344 through N 348) as a virtual storage device (VD) 322-332, a storage controller 314-318 that does not have access to a PD 302-312 within a local PD subset zone (such as Zones A 344 through Zone N 348), may still gain access to a PD 302-312 by being zoned in with the other storage controllers 314-318 in the comprehensive Zone X 340 because each of the VDs 322-332 associated with each of the PDs 302-312 are made visible to each of the storage controllers 314-318 within comprehensive Zone X 340. Consequently, storage controller 1 (314) and associated server 1 (334) may access formerly inaccessible PDs in Zones B 346 through N 348, including PDI 306 through PDJ 308 via VDI 326 through VDJ 328, respectively, which are managed by storage controller 2 (316), and PDK 310 and/or PDL 312 via VDK 330 and VDL 332, respectively, which are managed by storage controller N 318. Storage controller 2 (316) and associated server 2 (336) may access formerly inaccessible PDs in Zones A 344 and Zone C through N 348, including PD1 (302) through PDH 304 via VD1 (322) through VDH 324, respectively, which are managed by storage controller 1 (314), and PDK 310 and/or PDL 312 via VDK 330 and VDL 332, respectively, which are managed by storage controller N 318. Storage controller N 318 and associated server N 338 may access formerly inaccessible PDs in Zones A 344 through N−1, including PD1 (302) through PDH 304 via VD1 (322) through VDH 324, respectively, which are managed by storage controller 1 (314), and PDI 306 through PDJ 308 via VDI 326 through VDJ 328, respectively, which are managed by storage controller 2 (316). One skilled in the art will recognize that the PDs, VDs, storage controllers and servers associated with Zones C through N−1 act in a similar fashion as described for Zones A 344, B 346, and N 348.

Figure 3B:
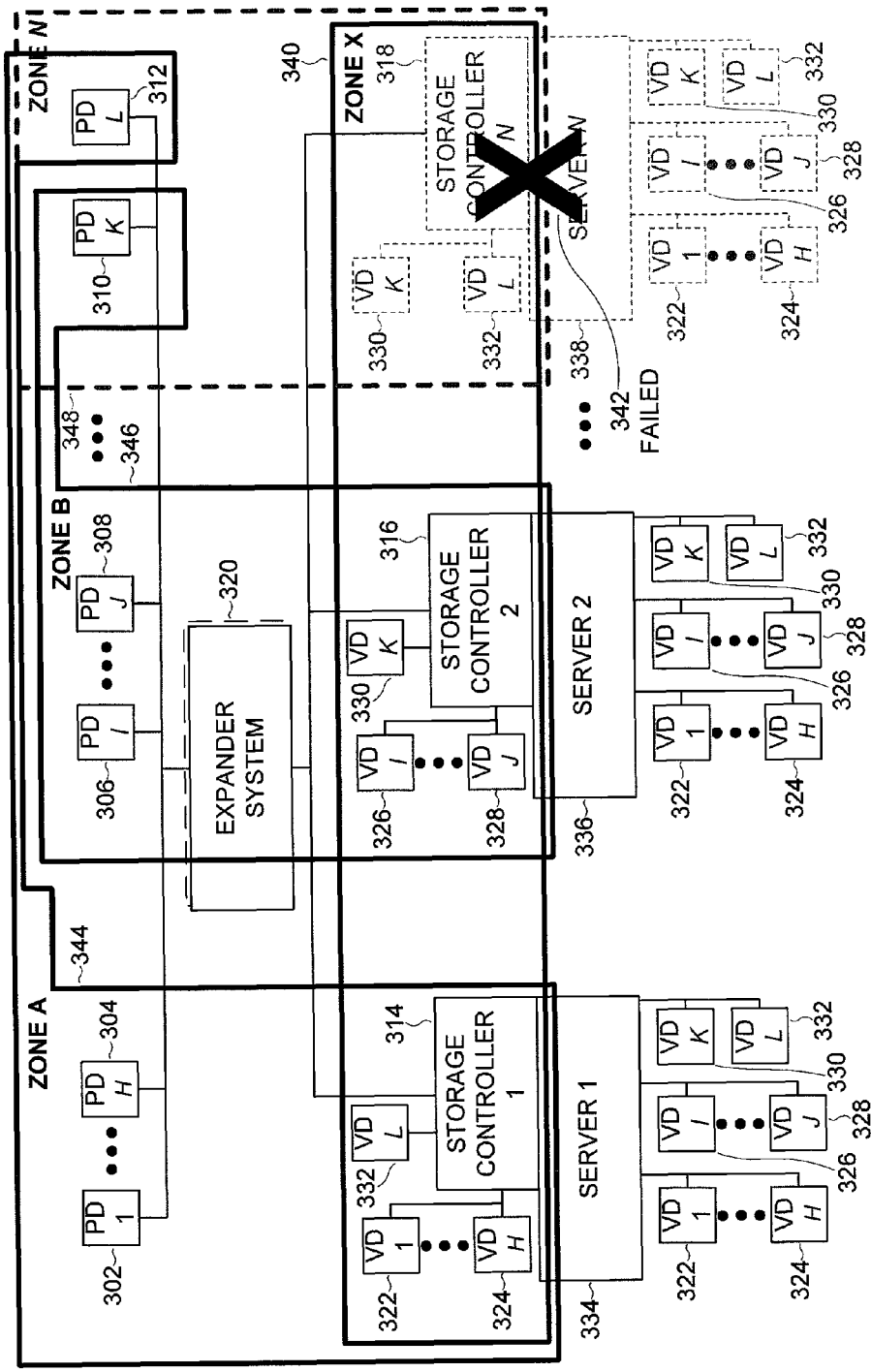
FIG. 3B is a zone block diagram of the embodiment of FIG. 3A with a failed storage controller/server.

FIG. 3B is a zone block diagram 350 of the embodiment of FIG. 3A with a failed 342 storage controller 318/server 338. In the embodiment shown in FIG. 3B, storage controller N 318/server N 338 has failed 342. Thus, storage controllers 1 (314) through N−1 remain functional and one, or more, of the functioning N−1 storage controllers may detect that storage controller N 318/server N 338 has failed. The failure monitoring techniques (i.e., heartbeat, etc.) disclosed in the description with respect to FIG. 2A may be used in the embodiment shown in FIGS. 3A and B.

Once one, or more, of the functioning storage controllers, storage controllers 1 (314) through storage controller N−1, detects that storage controller N 318 and/or server N 338 has failed 342, then one, or more, of functional storage controllers 1 (314) through N−1 may reconfigure the zoning of PDK 310 and PDL 312 to zone out PDK 310 and PDL 312 from PD subset Zone N 348. Unlike the less complex embodiment as disclosed with respect to FIG. 2B, the availability of multiple functional zones (i.e., Zone A 344 through Zone N−1), there are numerous options for where the PDs 310, 312 from failed Zone N may be assigned to retain accessibility to the PDs 310, 312. In the embodiment shown in FIG. 3A, it was elected that PDK 310 from failed Zone N 348 be zoned in with Zone B 346 and storage controller 2 (316). It was further elected that PDL 312 from failed Zone N 348 be zoned in with Zone A 344 and storage controller 1 (314). In the embodiment shown in FIG. 3B, it was elected to assign one of the PDs 310, 312 from failed Zone N 348 into two separate zones 344, 346 of the remaining functional zones. However, one skilled in the art will recognize that the selection of which of the remaining functional zones (i.e., Zones A 344 through N−1) will be assigned PDs 310, 312 from the failed Zone N 348 may be accomplished in many different ways, with the number of possible choices increasing quickly as the number of still functioning zones is increased. Thus, various embodiments may desire to employ various criteria to select which functioning zone will receive a particular PD 310, 312 from a failed zone 348. One embodiment may simply assign one of the PDs 310, 312 from the failed zone to each of the remaining functional zones as was done for the embodiment shown in FIG. 3. If there are more PDs 310, 312 in the failed zone 348 than there are remaining functional zones, once one PD 310, 312 from the failed zone 348 is assigned to each of the remaining functional zones, the system may recursively repeat the process adding one more PD 310, 312 from the failed zone 348 until all of the PDs 310, 312 from the failed zone 348 are assigned to the remaining functional zones. A further enhancement to an embodiment may prioritize the order in which the remaining functional zones are assigned a PD 310, 312 from the failed zone 348 based on a variety of quality of service criteria such as: the number of PDs already assigned to a remaining functional zone, the model/quality of the storage controller/server of the remaining functional zone, etc. Another embodiment may assign all of the PDs 310, 312 from a failed zone 348 to just one of the remaining functional zones. If there are multiple zone failures over time, the order that the remaining functional zones are assigned PDs 310, 312 from failed zones 348 may be based on similar criteria, including quality of service criteria, as described above (i.e., the number of PDs already assigned to a remaining functional zone, the model/quality of the storage controller/server of the remaining functional zone, etc.). One skilled in the art will recognize that there far too many possible options for assigning the PDs 310, 312 from the failed zone 348 to the remaining functional zones to list herein. However, it is recognized that some form of "smart" assignment based on zone quality of service criteria of the remaining functional zones may be beneficial if there are any differences in topology and/or hardware between the remaining functional zones. Further, when there is more than one remaining functional storage controller (i.e., storage controllers 1 (314) to N−1), an embodiment may have one storage controller take control and perform the necessary active-active zone management. Other embodiments may communicate between the remaining functional storage controllers such that more than one of the remaining functional storage controllers take part in the selection and configuration processing for the new zoning of the PDs 310, 312 from the failed zone 348.

In the embodiment shown in FIG. 3B, after one or more of the remaining functional storage controllers (i.e., storage controllers 1 (314) to N−1) detected that there is a failure 342 for Zone N 348, then one, or more, of the remaining functional storage controllers reconfigures the zoning of the PDs 310, 312 in failed Zone N 348 to zone out (i.e., remove) PDK 310 and PDL 312 from failed Zone N 348. The active-active reconfiguration is completed by zoning in (i.e., adding) PDK 310 with PD subset Zone B 346 and zoning in PDL 312 with PD subset Zone A 344. See, on FIG. 3B, the long necked extension of Zone B 346 to incorporate PDK 310 and the long necked extension of Zone A 344 to incorporate PDL 312 that describes the new zoning configuration after the failure 342 of storage controller N 318 and/or server N 338. With PDK 310 zoned in to PD subset Zone B 346, storage controller 2 (316) now has local access to PDK 310 such that VDK 330 is now local to storage controller 2 (316), and, consequently, is also local to associated server 2 (336). With PDL 312 zoned in to PD subset Zone A 244, storage controller 1 (314) now has local access to PDL 312 such that VDL 332 is now local to storage controller 1 (314), and, consequently, is also local to associated server 1 (334). Unlike the situation of the embodiment shown in FIG. 2B where there was only one surviving storage controller, the embodiment shown in FIG. 3B has multiple surviving storage controllers (i.e., storage controllers 1 (314) through N−1), and, accordingly, comprehensive Zone X 340 continues to provide access to PDs 302-312 that are remote to a zone via the VDs 322-332 presented by other storage controllers for the remote PDs 302-312 (i.e., where the storage controller in the zone does not have local access to a PD because the PD is not zoned in with the storage controller). After the failure 342 for the embodiment shown in FIG. 3B, comprehensive Zone X 340 provides similar functionality as before the failure, except that access to and management of PDK 310 is now provided by storage controller 2 (316) via VDK 330, and access to and management of PDL 312 is now provided by storage controller 1 (314) via VDL 332. Accordingly, remaining functional storage controllers 1 (314) to N−1 and associated servers 1 (334) to N−1 are able to maintain access to PDK 310 and PDL 312 by reassigning the zoning appropriately despite the fact that the original storage controller, storage controller N 318, zoned in with PDK 310 and PDL 312 is considered to be failed 342. When one, or more, of the remaining functional storage controllers (i.e., storage controllers 1 (314) to N−1) detects that storage controller N 318 and/or server N 338 has returned to normal operation, one, or more, of the functioning storage controllers 1 (314) to N−1, and/or newly returned functioning storage controller N 318 may reconfigure the zoning of PDK 310 and PDL 312 such that PDK 310 and PDL 312 are zoned out of PD subset Zones B 246 and A 244, respectively, and zoned in with the original "owning" PD subset Zone N 348, and the system returns to operation as described in the disclosure with respect to FIG. 3A.

Figure 4:
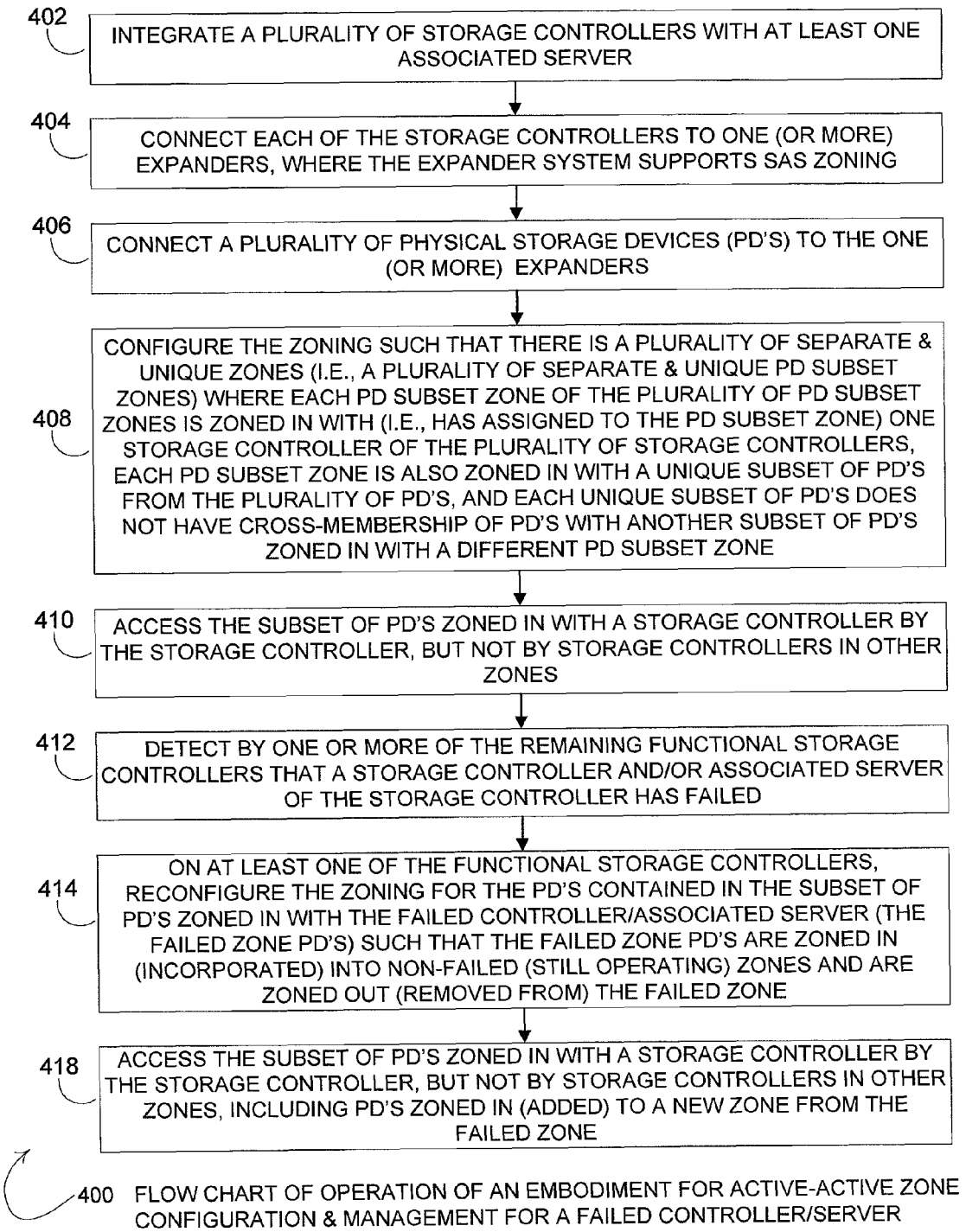
FIG. 4 is flowchart of operation of an embodiment for active-active zone configuration and management for a failed storage controller and/or associated server.

FIG. 4 is flowchart 400 of operation of an embodiment for active-active zone configuration and management for a failed storage controller and/or associated server. At step 402, a plurality of storage controllers are integrated with at least one associated server that acts as the host servers for the storage controllers. As described above, various embodiments may integrate/associate one storage controller per associated host server. Other embodiments may integrate/associate two or more storage controllers with a single host server such that the single host server acts as the associated host server for the one or more storage controllers. Still other embodiments may have servers integrated/associated with one storage controller and other servers integrated/associated with a plurality of storage controllers. The communication restrictions for the zoning configuration apply for each storage controller regardless of whether the storage controller is integrated/associated with a host server that is also integrated/associated with another storage controller. As also described above, the storage controller may be integrated with a host server as an external peripheral device connected via a communication channel, as an expansion card placed in an expansion slot/interface of the associated host server, as a module/subsystem built directly into the hardware of the associated host server (e.g., a circuit built directly onto the circuit board or built into a chip of the motherboard/circuitry of the associated server hardware), or via any other means for integrating a storage controller with an associated host server. For various embodiments, the active-active RAID functionality provided by an embodiment may beneficially address fault tolerance issues for DAS RAID storage controllers. At step 404, each of the storage controllers is connected to one, or more, expanders. The expander system comprised of the one or more expanders should support SAS zoning. At step 406, a plurality of physical storage devices (PD's) are connected to the one or more expanders. At step 408, the zoning is configured such that there is a plurality of separate and unique zones (i.e., a plurality of separate and unique PD subset zones). Each PD subset zone of the plurality of PD subset zones is zoned in with (i.e., has assigned to the PD subset zone) one storage controller of the plurality of storage controllers. Each PD subset zone is also further zoned in with a unique subset of PDs from the plurality of PDs in the SAS architecture. Each unique subset of PDs does not have cross-membership of PDs with (i.e., does not contain any of the same PDs as) another subset of PDs zoned in with another PD subset zone. The initial configuration of the zoning in step 408 may be performed using available and/or standard zoning configuration tools. If desired, an embodiment may supply a zoning configuration tool with the storage controllers that may permit the initial zoning configuration to be performed through one, or more, of the storage controllers within the SAS architecture. At step 410, the subset of PDs zoned in with each storage controller is accessed by the storage controller zoned in with the subset of PDs. Without additionally configuring a comprehensive zone (see, for example, the disclosure with respect to FIG. 6), the other storage controllers on the SAS architecture will not have access to the PDs that are local to (i.e., zoned in with) a particular storage controller.

At step 412, one, or more, of the remaining functional storage controllers detects that a storage controller and/or the associated server of the storage controller has failed. As described above in the disclosure with respect to FIG. 2B, any acceptable technical means to detect failure of the storage controller and/or associated server may be used to detect the failure, including "heartbeat" signals sent over the SAS communication channels. At step 414, at least one of the remaining functional storage controllers dynamically reconfigures during real-time operation the zoning for the PDs contained in the subset of PDs zoned in with the failed storage controller/server (i.e., the failed zone PDs) such that the failed zone PDs are zoned in (i.e., incorporated into/added to) a PD subset zone of another still functioning storage controller and the failed zone PDs are zoned out of (i.e., removed from) the failed zone. At step 418, the subset of PDs zoned in with each storage controller are accessed by the storage controller zoned in with the subset of PDs, including the PDs from the failed zone that are now zoned in, and locally accessible to the storage controller and the server associated with the storage controller where the failed zone PDs were rezoned to at step 414. As with step 410 above, without additionally configuring a comprehensive zone (see, for example, the disclosure with respect to FIG. 6), the other storage controllers on the SAS architecture will not have access to the PDs that are local to (i.e., zoned in with) a particular storage controller.

Figure 5:
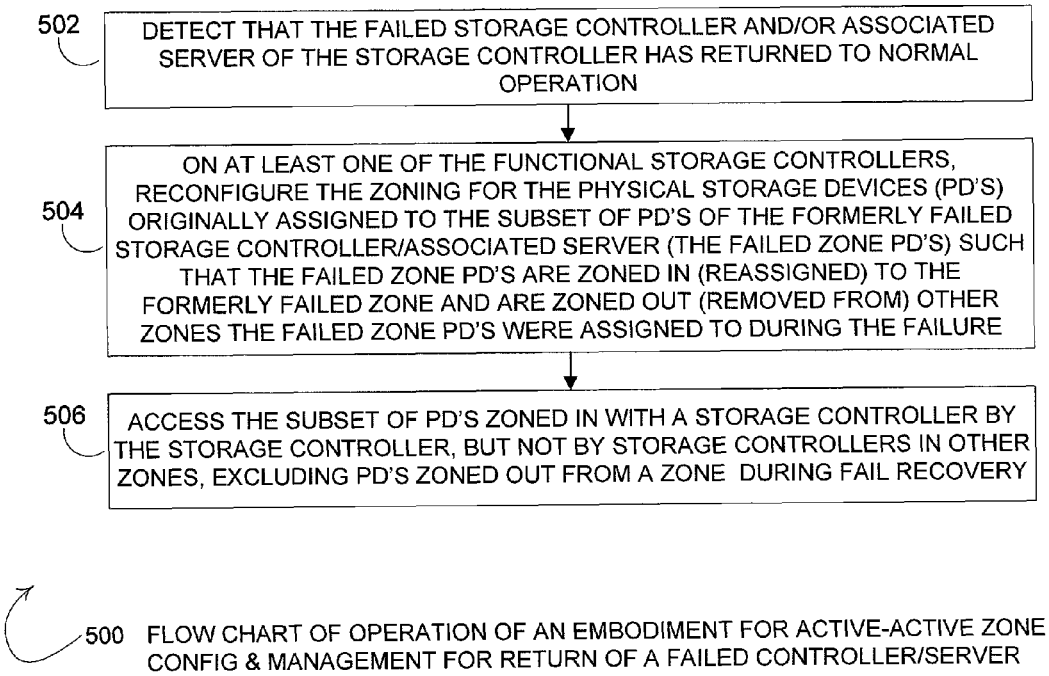
FIG. 5 is flowchart of operation of an embodiment for active-active zone configuration and management for the return of a failed storage controller and/or associated server.

FIG. 5 is flowchart 500 of operation of an embodiment for active-active zone configuration and management for the return of a failed storage controller and/or associated server. At step 502, one, or more, of the remaining functional storage controllers detects that the failed storage controller and/or the associated failed server of the storage controller has returned to normal operation. As described above in the disclosure with respect to FIG. 2B, any acceptable technical means to detect failure of the storage controller and/or associated server may be used to detect the failure, including "heartbeat" signals sent over the SAS communication channels. At step 504, at least one of the functional storage controllers, which now includes the formerly failed storage controller that is now functioning properly, reconfigures the zoning for the PDs originally assigned (i.e., zoned in) to the subset of PDs of the formerly failed storage controller/server (i.e., the failed zone PDs) such that the failed zone PDs are zoned in with (i.e., reassigned back to) the formerly failed zone and are zoned out (i.e. removed from) other zones where the failed zone PDs were assigned during the failure of the originally assigned storage controller/server. At step 506, the subset of PDs zoned in with each storage controller are accessed by the storage controller zoned in with the subset of PDs, excluding the PDs zoned out (i.e., taken away from) a zone during the failure recovery of step 504. As for the access steps (410 and 416) of FIG. 4, without additionally configuring a comprehensive zone (see, for example, the disclosure with respect to FIG. 6), the other storage controllers on the SAS architecture will not have access to the PDs that are local to (i.e., zoned in with) a particular storage controller.

Figure 6:
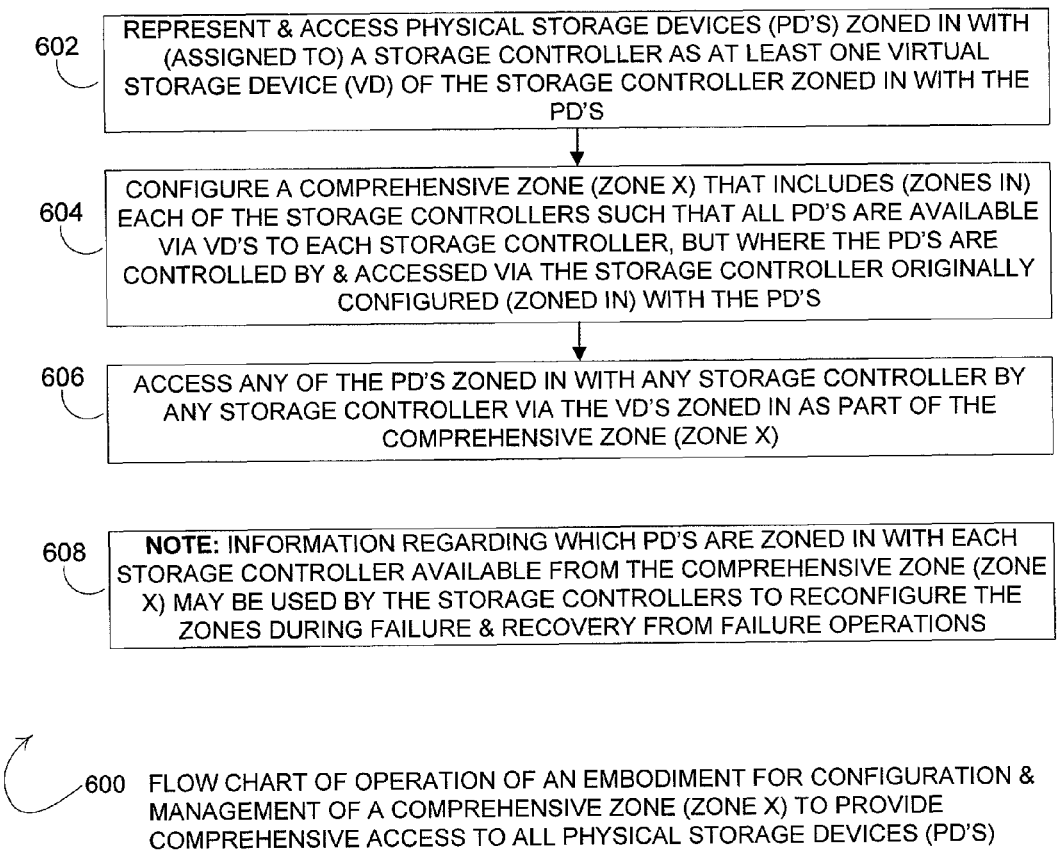
FIG. 6 is flowchart of operation of an embodiment for configuration and management of a comprehensive zone (i.e., zone x) that provides comprehensive access to all physical storage devices zone in with a plurality of storage controllers of the comprehensive zone.

FIG. 6 is flowchart 600 of operation of an embodiment for configuration and management of a comprehensive zone (i.e., zone x) that provides comprehensive access to all physical storage devices zoned in with a plurality of storage controllers of the comprehensive zone. At step 602, physical storage devices (PDs) zoned in with (i.e., assigned to) a storage controller are represented as, and accessed via, at least one logical virtual storage device (VD) presented by the storage controller zoned in with the PDs. At step 604, a comprehensive zone (Zone X) is configured to include (i.e., zone in) each of the storage controllers such that all of the PDs are made available to each storage controller via the VD with "remote" access to the corresponding PD. Thus, on each storage controller, for VDs that do not correspond to a zoned in PD for the storage controller, the VD has remote access to the corresponding PD by sending I/O requests to the storage controller that does have local access to the corresponding PD. Accordingly, the storage controller with local access to each PD maintains access to and control of the PD by handling the I/O requests from the other storage controllers in the comprehensive zone for the PD. Thus, all of the PDs are still made available for access by each storage controller, even if the access is remote through another storage controller that "owns" (i.e., is zoned in with) the PD. The initial configuration of the zoning for the comprehensive Zone X in step 604 may be performed using available and/or standard zoning configuration tools. If desired, an embodiment may supply a zoning configuration tool with the storage controllers that may permit the initial zoning configuration to be performed through one, or more, of the storage controllers within the SAS architecture. At step 606, any of the storage controllers may access any of the PDs either by accessing via the VDs representing PDs locally zoned in with each storage controller or by accessing via the remote VDs for PDs zoned in with other storage controllers. Note 608 discloses that an embodiment of a storage controller may advantageously use the information regarding which PDs are zoned in with each storage controller available from the comprehensive zone (Zone X) in order to perform the operations of reconfiguring the zones during either or both of the failure operations and the recovery from failure operations.

Various embodiments may provide the control and management functions detailed herein via an application operating on a storage controller, including storage controllers integrated within other electronic devices. Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for active-active RAID (Redundant Array of Independent Disks) functionality for a DAS (Direct Attached Storage) RAID system using storage controllers connected in a SAS (Serial Attached SCSI (Small Computer System Interface)) architecture comprising:
   connecting a plurality of storage controllers to an expander system, said expander system supporting SAS zoning;

connecting a plurality of physical storage devices (PDs) to said expander system;

configuring zoning of said DAS RAID system such that there is a plurality of separate and unique PD subset zones, each PD subset zone of said plurality of PD subset zones is zoned in with one storage controller of said plurality of storage controllers, each PD subset zone is further zoned in with a unique subset of PDs from said plurality of PDs, and each unique subset of PDs does not have cross-membership of PDs with another subset of PDs zoned in with a different PD subset zone, such that each PD subset zone of said plurality of subset zones is zoned in with said one storage controller of said plurality of storage controllers and not a host server associated with said one storage controller of said plurality of storage controllers permitting said host server associated with said one storage controller to also be associated with other storage controllers of said plurality of storage controllers and other PD subset zones of said plurality of subset zones without affecting zoning restrictions and function of said one storage controller of said plurality of storage controllers;

detecting by at least one functioning storage controller of said plurality of storage controllers that another storage controller has failed;

reconfiguring by said at least one functioning storage controller of said plurality of storage controllers said zoning of said DAS RAID system such that each PD from said unique subset of PDs zoned in with said separate and unique PD subset zone that corresponds to said failed another storage controller is zoned in with said separate and unique PD subset zone that corresponds to one of said plurality of storage controllers that have not failed, and each PD of said PDs from said unique subset of PDs zoned in with said separate and unique PD subset zone that corresponds to said failed another storage controller is zoned out of said separate and unique PD subset zone that corresponds to said failed another storage controller; and accessing PDs from each unique subset of PDs of said plurality of unique subsets of PDs by said storage controller that is zoned in with each separate and unique PD subset zone that corresponds to each unique subset of PDs of said plurality of unique subsets of PDs as reconfigured to zone out said failed another storage controller.

2. The method of claim 1 further comprising:

integrating each of said plurality of storage controllers with at least one associated server; and processing input/output requests for said plurality of PDs from at least one associated server by said storage controller integrated with said at least one associated server in accord with zoning configuration of said storage controller integrated with said at least one associated server; and wherein:

said step of detecting by at least one functioning storage controller that said another storage controller has failed further comprises detecting a failure of said at least one associated server with which said another storage controller is integrated as a failure of said another storage controller.

3. The method of claim 1 wherein said step of reconfiguring by said at least one functioning storage controller said zoning of said DAS RAID system such that each PD from said unique subset of PDs zoned in with said separate and unique PD subset zone that corresponds to said failed another storage controller reconfigures said zoning of said DAS RAID system such that at least one PD from said unique subset of PDs zoned in with said separate and unique PD subset zone that corresponds to said failed another storage controller is zoned in with said separate and unique PD subset zone that corresponds to a first storage controller of said plurality of storage controllers that haves not failed, and additional PDs from said unique subset of PDs zoned in with said separate and unique PD subset zone that corresponds to said failed another storage controller are uniquely zoned in with storage controllers that have not failed other than said first storage controller that has not failed of said plurality of storage controllers.

4. The method of claim 3 further comprising selecting by said at least one functioning storage controller of said plurality of storage controllers which functioning storage controllers of said plurality of storage controllers will have at least one PD from said unique subset of PDs zoned in with said separate and unique PD subset zone that corresponds to said failed another storage controller reconfigured to be zoned in with separate and unique PD subset zones that correspond to functioning storage controllers of said plurality of storage controllers based on quality of service criteria for each functional storage controller of said plurality of storage controllers.

5. The method of claim 4 wherein said quality of service criteria is comprised of at least one of a group comprising: a number of PDs already zoned in with a remaining functional storage controller, a model of said remaining functional storage controller, and a quality rating of said remaining functional storage controller.

6. The method of claim 1 wherein accessing of PDs by a storage controller locally zoned in with a PD in a PD subset zone corresponding to said storage controller includes reading from, writing to, and management of said PD by said storage controller locally zoned in with said PD in said PD subset zone corresponding to said storage controller.

7. The method of claim 1 further comprising:

detecting by at least one functioning storage controller that said failed another storage controller has returned to normal operation;

reconfiguring by said at least one functioning storage controller said zoning of said DAS RAID system such that each PD originally from said unique subset of PDs zoned in with said separate and unique PD subset zone that corresponds to said failed another storage controller that has returned to normal operation is zoned in with said separate and unique PD subset zone that corresponds to said failed another storage controller that has returned to normal operation, and each PD of said PDs originally from said unique subset of PDs zoned in with said separate and unique PD subset zone that corresponds to said failed another storage controller that has returned to normal operation is zoned out of separate and unique PD subset zones that correspond to storage controllers other than said failed another storage controller that has returned to normal operation; and accessing PDs from each unique subset of PDs of said plurality of unique subsets of PDs by said storage controller that is zoned in with each separate and unique PD subset zone that corresponds to each unique subset of PDs of said plurality of unique subsets of PDs as reconfigured to return said zoning of said DAS RAID system to an original pre-failure state.

8. The method of claim 7 wherein said failed another storage controller that has returned to normal operation is considered to be a functioning storage controller with respect to performing steps of said method for active-active RAID functionality for said DAS RAID system using storage controllers connected in said SAS architecture.

9. The method of claim 1 further comprising:
representing PDs from each unique subset of PDs of said plurality of unique subsets of PDs by said storage controller that is zoned in with each separate and unique PD subset zone that corresponds to each unique subset of PDs of said plurality of unique subsets of PDs as at least one virtual storage device (VD);
accessing each PD from each unique subset of PDs of said plurality of unique subsets of PDs by said storage controller that is zoned in with each separate and unique PD subset zone that corresponds to each unique subset of PDs of said plurality of unique subsets of PDs via said at least one VD corresponding to each PD from each unique subset of PDs of said plurality of unique subsets of PDs;
configuring said zoning of said DAS RAID system such that there is a comprehensive zone that zones in each storage controller of said plurality of storage controllers and does not zone in PDs from said plurality of PDs such that said at least one VD representing PDs zoned in with each storage controller of said plurality of storage controllers is accessible by other storage controllers of said plurality of storage controller;
accessing PDs zoned in with a PD subset zone corresponding to said other storage controllers of said plurality of storage controllers from each storage controller of said plurality of storage controllers via said at least one VD representing said PDs zoned in with said PD subset zone corresponding to said other storage controllers of said plurality of storage controllers.

10. The method of claim 1 wherein said plurality of physical storage devices are comprised of at least one of a group comprising: hard disk drive, solid state media disk, tape drive, and optical drive.

11. A storage controller device for active-active RAID (Redundant Array of Independent Disks) functionality for a DAS (Direct Attached Storage) RAID system connected in a SAS (Serial Attached SCSI (Small Computer System Interface)) architecture having a plurality of storage controllers connected to an expander system, a plurality of physical storage devices (PDs) to said expander system, wherein said expander system supports SAS zoning, and zoning of said DAS RAID system is configured such that there is a plurality of separate and unique PD subset zones, each PD subset zone of said plurality of PD subset zones is zoned in with one storage controller of said plurality of storage controllers, each PD subset zone is further zoned in with a unique subset of PDs from said plurality of PDs, and each unique subset of PDs does not have cross-membership of PDs with another subset of PDs zoned in with a different PD subset zone, said storage controller device comprising:
an active-active zone management module that detects that another storage controller of said plurality of storage controllers has failed, reconfigures said zoning of said DAS RAID system such that each PD from said unique subset of PDs zoned in with said separate and unique PD subset zone that corresponds to said failed another storage controller is zoned in with said separate and unique PD subset zone that corresponds to one of said plurality of storage controllers that have not failed, and each PD of said PDs from said unique subset of PDs zoned in with said separate and unique PD subset zone that corresponds to said failed another storage controller is zoned out of said separate and unique PD subset zone that corresponds to said failed another storage controller, said active-active zone management module operates within said single storage controller device such that each PD subset zone of said plurality of subset zones is zoned in with said one storage controller of said plurality of storage controllers and not a host server associated with said one storage controller of said plurality of storage controllers permitting said host server associated with said one storage controller to also be associated with other storage controllers of said plurality of storage controllers and other PD subset zones of said plurality of subset zones without affecting zoning restrictions and function of said one storage controller of said plurality of storage controllers; and
a PD access module that accesses PDs from said unique subset of PDs of said plurality of unique subsets of PDs that are zoned in with said separate and unique PD subset zone that corresponds to said storage controller device, including PDs as reconfigured to zone out said failed another storage controller.

12. The storage controller device of claim 10 wherein:
each of said plurality of storage controllers is integrated with at least one associated server;
said PD access module further processes input/output requests for said plurality of PDs said at least one associated server integrated with said storage controller device in accord with zoning configuration of said storage controller device; and
said active-active zone management module further detects a failure of said at least one associated server with which said another storage controller is integrated as a failure of said another storage controller.

13. The storage controller device of claim 10 wherein said active-active zone management module reconfigures said zoning of said DAS RAID system such that at least one PD from said unique subset of PDs zoned in with said separate and unique PD subset zone that corresponds to said failed another storage controller is zoned in with said separate and unique PD subset zone that corresponds to a first storage controller of said plurality of storage controllers that have not failed, and additional PDs from said unique subset of PDs zoned in with said separate and unique PD subset zone that corresponds to said failed another storage controller are uniquely zoned in with storage controllers that have not failed other than said first storage controller that has not failed of said plurality of storage controllers.

14. The storage controller device of claim 13 wherein said active-active zone management module selects which functioning storage controllers of said plurality of storage controllers will have at least one PD from said unique subset of PDs zoned in with said separate and unique PD subset zone that corresponds to said failed another storage controller reconfigured to be zoned in with separate and unique PD subset zones that correspond to functioning storage controller of said plurality of storage controllers based on quality of service criteria for each functional storage controller of said plurality of storage controllers.

15. The storage controller device of claim 14 wherein said quality of service criteria is comprised of at least one of a group comprising: a number of PDs already zoned in with a remaining functional storage controller, a model of said remaining functional storage controller, and a quality rating of said remaining functional storage controller.

16. The storage controller device of claim 10 wherein said accesses by said PD access module includes reading from, writing to, and management of said PDs locally zoned in with said storage controller device.

17. The storage controller device of claim 10 wherein:
said active-active zone management module further detects that said failed another storage controller has returned to normal operation, and reconfigures said zoning of said DAS RAID system such that each PD originally from said unique subset of PDs zoned in with said separate and unique PD subset zone that corresponds to said failed another storage controller that has returned to normal operation is zoned in with said separate and unique PD subset zone that corresponds to said failed another storage controller that has returned to normal operation, and each PD of said PDs originally from said unique subset of PDs zoned in with said separate and unique PD subset zone that corresponds to said failed another storage controller that has returned to normal operation is zoned out of separate and unique PD subset zones that correspond to storage controllers other than said failed another storage controller that has returned to normal operation; and
said PD access module accesses PDs from said unique subset of PDs of said plurality of unique subsets of PDs that are zoned in with said separate and unique PD subset zone that corresponds to said storage controller device as reconfigured to return said zoning of said DAS RAID system to an original pre-failure state.

18. The storage controller device of claim 10 wherein:
said PD access module further represents each PD from said unique subset of PDs of said plurality of unique subsets of PDs that are zoned in with said separate and unique PD subset zone that corresponds to said storage controller device as at least one virtual storage device (VD), accesses each PD from said unique subset of PDs of said plurality of unique subsets of PDs that are zoned in with said separate and unique PD subset zone that corresponds to said storage controller device via said at least one VD corresponding to each PD from each unique subset of PDs of said plurality of unique subsets of PDs;
said zoning of said DAS RAID system is configured such that there is a comprehensive zone that zones in each storage controller of said plurality of storage controllers and does not zone in PDs from said plurality of PDs such that said at least one VD representing PDs zoned in with each storage controller of said plurality of storage controllers is accessible by other storage controllers of said plurality of storage controller; and
said PD access module further accesses each PD from said unique subset of PDs of said plurality of unique subsets of PDs that are zoned in with said separate and unique PD subset zone that corresponds to said storage controller device in response to input/output requests for said at least one VD representing said PDs from said unique subset of PDs of said plurality of unique subsets of PDs that are zoned in with said separate and unique PD subset zone that corresponds to said storage controller device.

19. The storage controller device of claim 10 wherein said plurality of physical storage devices are comprised of at least one of a group comprising: hard disk drive, solid state media disk, tape drive, and optical drive.

20. The storage controller device of claim 10 wherein said storage controller device is a DAS RAID type storage controller device.

* * * * *